United States Patent
Kowalski et al.

[11] Patent Number: 5,868,456
[45] Date of Patent: Feb. 9, 1999

[54] SELECTIVELY HEAT TREATED SIDE INTRUSION BEAMS AND METHOD FOR MAKING THE SAME

[75] Inventors: Daniel J. Kowalski, Lake Orion; Ben Kowalski, Troy; Edward Rowady, Grosse Pointe, all of Mich.

[73] Assignee: Trim Trends, Inc., Farmington Hills, Mich.

[21] Appl. No.: 939,830

[22] Filed: Sep. 29, 1997

[51] Int. Cl.$^6$ ............................................. B60J 5/00
[52] U.S. Cl. ...................... 296/146.6; 52/731.6; 52/790.1
[58] Field of Search ................ 52/720.3, 724.1, 52/726.2, 729.1, 730.4, 730.5, 731.1, 731.6, 790.1; 296/146.6

[56] References Cited

U.S. PATENT DOCUMENTS

| | | |
|---|---|---|
| 5,192,376 | 3/1993 | Tanabe et al. . |
| 5,232,261 | 8/1993 | Kuroda et al. ................. 52/790.1 X |
| 5,411,812 | 5/1995 | Bilimoria . |
| 5,487,795 | 1/1996 | Kim et al. . |
| 5,527,404 | 6/1996 | Warren . |

*Primary Examiner*—Creighton Smith
*Attorney, Agent, or Firm*—Dykema Gossett PLLC

[57] ABSTRACT

A selectively heat treated side intrusion beam includes a beam body having a center portion heat treated and end portions not heat treated. The beam body is affixed to end brackets that couple the beam body to the automotive vehicle door. The method for forming a side intrusion beam includes the steps of moving beam stock through a heater; controlling the heater to cycle between an on-state and an off-state with respect to predetermined portions of the length of the beam; quenching the beam stock; and, cutting the beam stock at untreated portions to form the beam body.

18 Claims, 2 Drawing Sheets

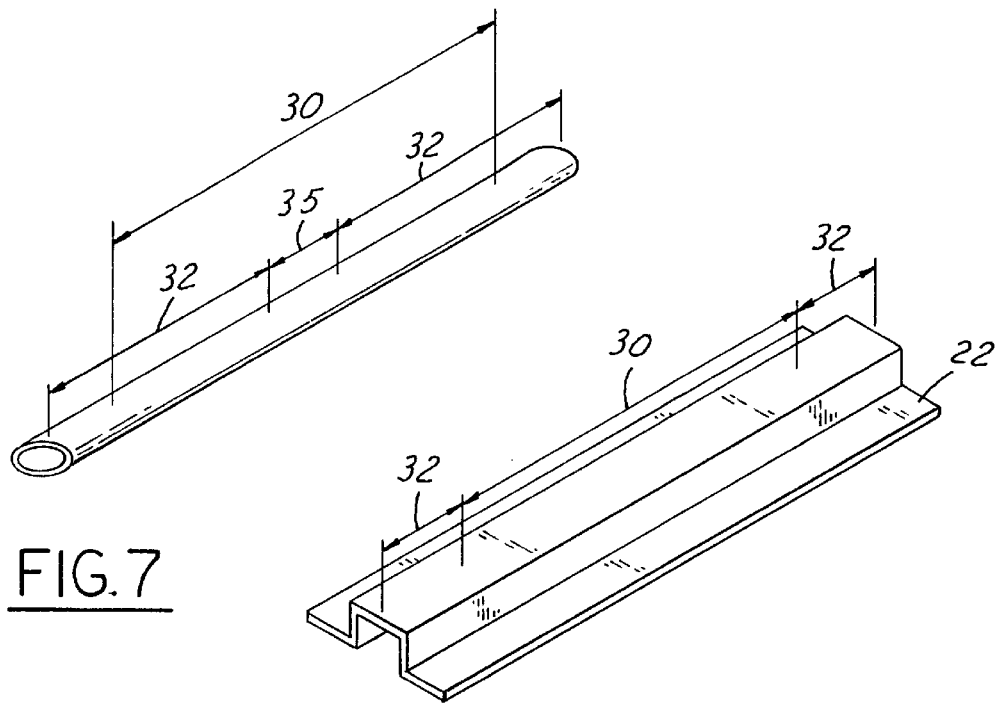
FIG. 7
FIG. 6
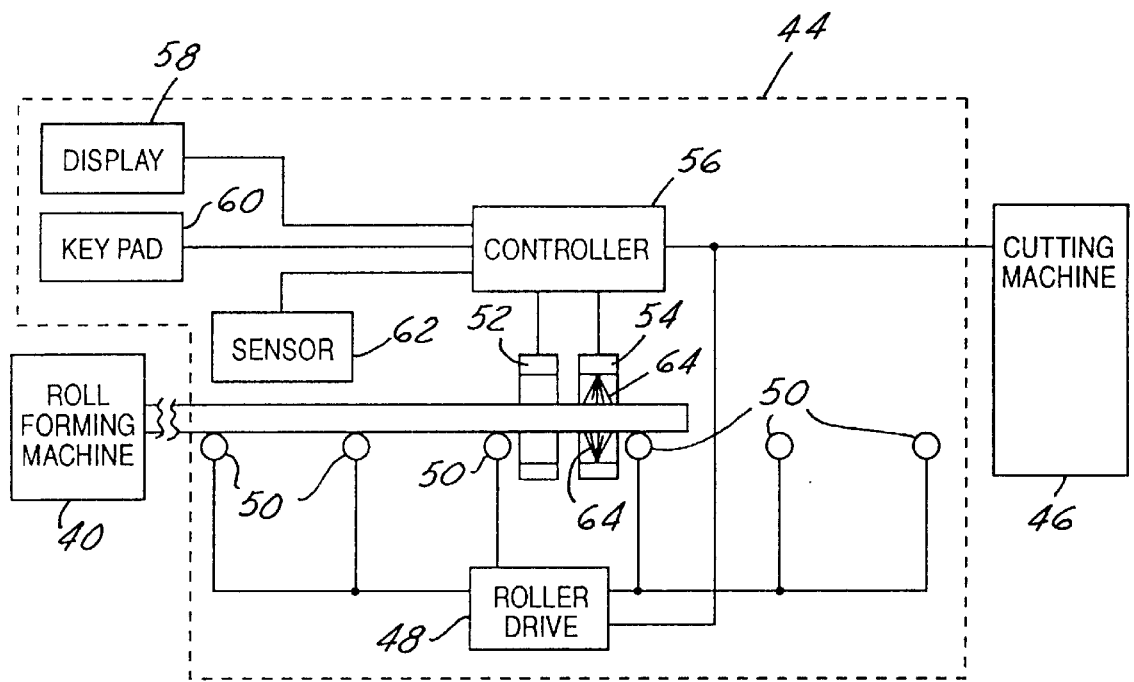
FIG. 8

SELECTIVELY HEAT TREATED SIDE INTRUSION BEAMS AND METHOD FOR MAKING THE SAME

BACKGROUND OF THE INVENTION

The present invention relates to an impact beam for a door of an automotive vehicle and, more particularly, to a method and apparatus for making a heat treated side intrusion beam.

To improve safety in motor vehicles, side intrusion beams, also called side impact beams, have been designed into the passenger doors of automotive vehicles. Side intrusion beams are typically formed of steel or combinations of steel and composite materials. The side intrusion beams extend across the vehicle doors to provide occupant protection. Typically, the side intrusion beams have a beam body with a pair of brackets mounted at each end. The brackets are used to mount the beam body within the door. Commonly, side intrusion beam manufacturers provide the beam body and bracket assembly to the automotive vehicle manufacturer for installation as the doors are being assembled.

Federal motor vehicle safety standards require that side intrusion beams meet certain load or energy absorbing criteria for a specified lateral displacement of the door in response to a vehicle being subjected to a side impact. Reducing the cost of implementing the federal safety standards is an ever present goal of automotive vehicle manufacturers. Many previously known side intrusion beam assemblies require the use of relatively expensive materials and expensive material processing due to the high strength requirements.

Several examples of side intrusion beams use a beam body which is formed of heat treated steel. The beam body is subjected to heat-treating throughout the length of the beam. The beam is then welded to the end brackets that are not heat treated. Commonly, long lengths of heat treated steel material is provided to the manufacturer of the side intrusion beam. The beam body is cut to length and then welded to the end brackets. One problem with such a method for forming side intrusion beams is that purchasing already hardened steel is extremely expensive. Also, because the material is so hard, special processing techniques such as laser cutting must be implemented to properly size the beam bodies. Special processing techniques use special equipment that is relatively expensive. Another drawback to such prior beams is that because the brackets are not hardened and the entire steel bar is hardened, more stress is placed on the welds. That is, the entire beam resists bending while the brackets deform. Thus, the impact is directed to the weld area where the weld material absorbs much of the energy of impact, rather than the beam and brackets.

SUMMARY OF INVENTION

It is therefore an object of the invention to provide improved load absorbing characteristics for a side intrusion beam while reducing the cost to manufacture such beams.

In one aspect, the present invention provides a side intrusion beam assembly having a pair of end brackets and a beam body coupled thereto. The beam body has a length with a center portion and end portions. The end portions are mounted to the bracket. The center portion of the beam is heat treated while the end portions are not.

In a further aspect, the present invention provides a method of forming a side intrusion beam comprising the steps of: moving beam stock through a heater; controlling the heater to cycle between an on-state and an off-state with respect to predetermined portions of the length of the beam; quenching the beam stock; and, cutting the beam stock at the untreated portions to form the beam.

In yet another aspect an apparatus for forming a side intrusion beam has a plurality of rollers for moving beam stock along a predetermined path, the beam stock has a length. A heater is mounted adjacent to the predetermined path. A quenching apparatus is also mounted adjacent to the path after the heater. A controller is coupled to the heater for controlling the operation between an on-state and an off-state with respect to the length of the beam stock to form heat treated portions and non heated portions respectively.

One advantage of the present invention is that a less expensive cutting process may be used to cut the beam stock because the cuts are made at the non heat treated portions. The result is a more cost efficient method for cutting the beams.

Another advantage of the present invention is that the end portions of the beam body are not heat treated and thus conditions are more favorable for stronger welds between the non heat treated metal of the brackets and the beam body. Welding is easier and more reliable when joining two similar hardness materials.

Yet another advantage of the present invention is that distortion in the beam body is reduced. That is, as a beam stock is heat treated, the beam stock warps as a function of length. Because the amount of heat-treatment is reduced, less distortion will occur.

Still another advantage is that improved bending characteristics are obtained because the bracket and non heat treated portion of the beam become flaccid during crash.

BRIEF DESCRIPTION OF THE DRAWINGS

Other features and advantages of the present invention will become apparent in the following detailed description which should be read in conjunction with the drawings:

FIG. 6 is a perspective view of the center beam of a side intrusion beam having a hat-shaped cross section;

FIG. 7 is a perspective view of a round cross section side intrusion beam having multiple heat treated and non heat treated portions; and FIG. 8 is a diagrammatic representation of an apparatus for forming a side intrusion beam according to the present invention.

DETAILED DESCRIPTION OF THE PREFERRED EMBODIMENT

Figure 1:
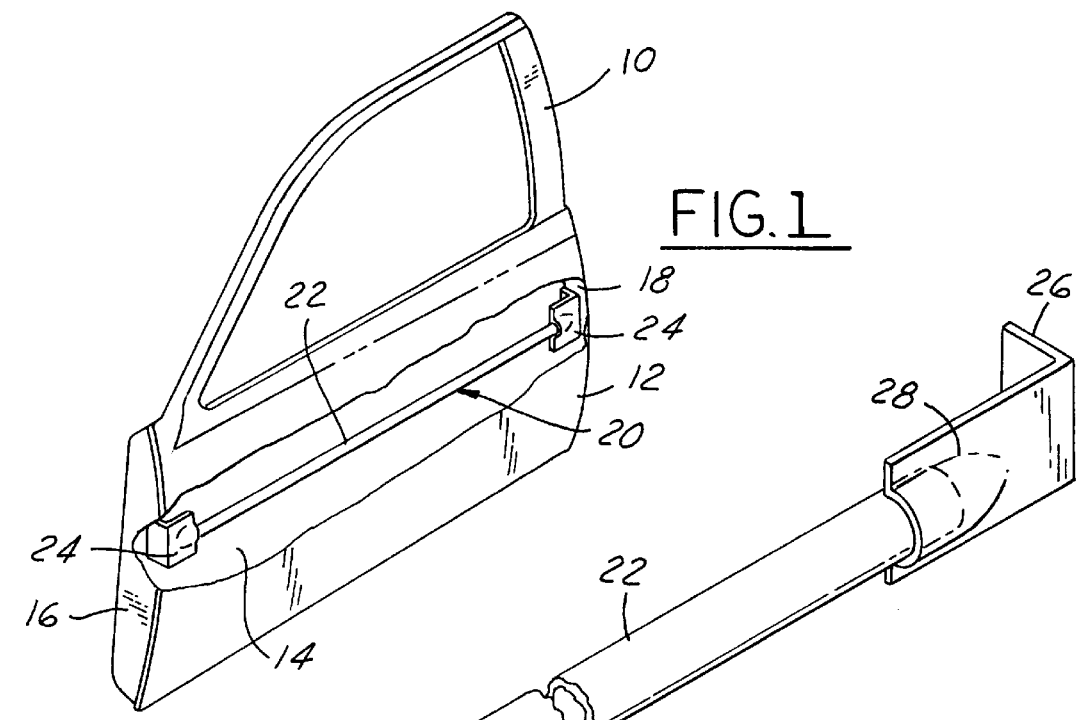
FIG. 1 is a perspective view of an automotive vehicle door having a door beam formed according to the present invention.

In the following figures, like reference numerals will be used to represent like components. The figures illustrate a side intrusion beam having particular cross sections and having particularly shaped end brackets. However, other shaped end brackets and cross sections would be evident to those skilled in the art.

Referring to FIG. 1, a vehicle door 10 is adapted to be hingedly mounted to a vehicle body. Door 10 includes an outer sheet metal panel 12, an inner sheet panel 14, and metal front and rear end walls 16 and 18, respectively, to which the outer and inner panels 12 and 14 are welded. The outer panel 12, the inner panel 14 and the end walls 16 and 18 define a door well 19 therebetween. In order to structurally reinforce door 10 against side door impacts, a side intrusion beam 20 is mounted horizontally within the end door well 19 and secured to end walls 16 and 18 to form a protective impediment across door 10. Side intrusion beam 20 is designed to absorb the energy of impact against vehicle door 10. The side intrusion beam assembly processed according to the present invention provides a cost efficient method for processing the beam while maintaining federal vehicle safety standards.

Figure 2:
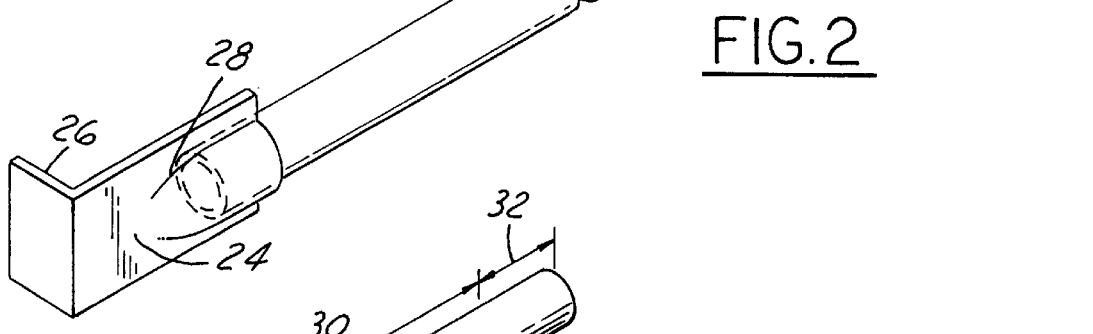
FIG. 2 is a perspective view of an automotive vehicle side intrusion beam assembly according to the present invention.

Referring now to FIGS. 1 and 2, side intrusion beam 20 generally includes an elongated beam body 22 having a predetermined cross sectional configuration as will be described below. As illustrated in FIG. 2 beam body has a generally constant circular and tubular cross sectional shape. Side intrusion beam 20 also includes end brackets 24. End brackets 24 are preferably welded to beam body 22. End brackets 24 have flanges 26. Flanges 26 are used to mount brackets 24 to end walls 16 and 18. Commonly, end brackets are spot welded to end walls 16 and 18 during assembly of the door. End brackets may also have a recess 28 which is used to locate beam body 22 with respect to end brackets 24 during welding of the beam body 22 to end brackets 24. Various shapes of end brackets and mounting configurations such as recess 28 would be evident to those skilled in the art. Such shapes are dictated by the package space provided by the automobile manufacturer within which to fit the side intrusion beam.

Referring now to FIGS. 3, 4, 5 and 6 various cross sections of beam bodies 22 are illustrated, each being manufactured according to the process of the present invention. Each of beams 22 have a center portion, 30, that is heat treated and end portions 32 that are not heat treated. End portions 32 are secured to brackets 24 as shown in FIG. 2.

The steel used for the beam body is preferably a medium carbon, low alloy boron steel. Elements in the composition of the steel may include carbon at 0.2–0.26%, manganese at 1.00–1.35%, boron at 0.0005–.003% and various other elements. Suitable steel compositions respond to heat-treatment with increased physical properties. Suitable materials would generally conform to GM specification 43696M.

Figure 3:
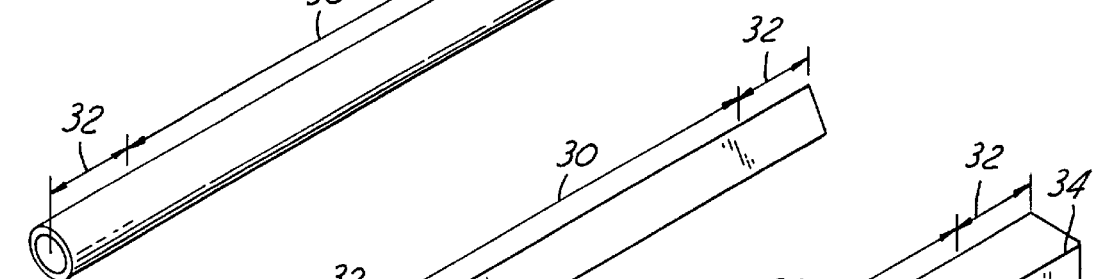
FIG. 3 is a perspective view of the beam body having a round cross section.

Beam body 22 of FIG. 3 has a round cross section that uses less material than the other cross sections. Because there are no corners in a round cross section, heat treating is more evenly applied across center portion 30.

Figure 4:
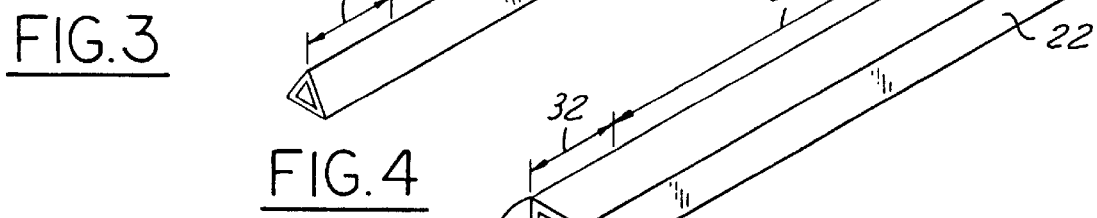
FIG. 4 is a perspective view of the beam body having a triangular cross section.

In FIG. 4 a triangular tube is illustrated. Experimentally it has been found that a triangular shaped tube is very cost effective in terms of strength per amount of material utilized.

Figure 5:
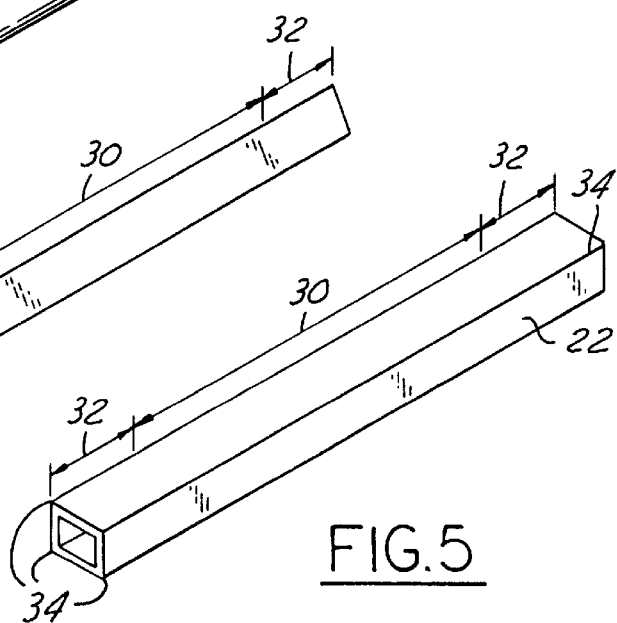
FIG. 5 is a perspective view of the beam body having a rectangular cross section.

In FIG. 5 a rectangular tubular beam is illustrated. A rectangular tube such as a square tube has the highest strength of the beam bodies 22 illustrated. The rectangular tube has rounded corners 34. As the radius of corners 34 are increased the load bearing characteristics of the rectangular tube more closely approximate the characteristics of a round tube such as that shown in FIG. 3.

In FIG. 6 a hat-shaped cross section is illustrated. Hat-shaped cross sections are commonly used for side intrusion beams. Thus, by having the capability to use various cross sections the load bearing characteristics for the beam body 22 may be changed to suit the needs for a particular application.

Referring now to FIG. 7, the center portion 30 need not be entirely heat treated. The center portion 30 may have non heat treated portions interspersed therein. By interspersing non heat treated and heat treated portions the load characteristics may be further modified for particular applications. As illustrated, center portion 30 has one non heat treated portion 36. Any of the cross sectional shaped areas in FIGS. 3 through 6 may have untreated portions within center portion 30.

Referring now to FIG. 8, a roll form machine 40 may be used to supply beam stock 42 to heat treatment machine 44. Beam stock 42 may for example be any of beam stock illustrated in FIGS. 3 through 6. Commonly beam stock 42 is provided in long lengths between 15 and 20 feet. Roll forming machine 40 processes flat material into the desired shape which may include welding for tubular products. Roll forming machines are commonly known in the art. A direct feed or manual feed may be used between the roll forming machine and heat treatment machine 44. Heat treatment machine 44 processes beam stock 42. Cutting machine 46 is illustrated as receiving processed beam stock from heat treatment machine 44. Cutting machine 46 may also receive material from roll forming machine 40 and size beam stock 42 prior to entering heat treatment machine 44. Cutting machine 46 may for example be a knife cut or moving arm saw. Because the cutting is performed at non heat treated portions of beam stock 42 either before or after heat treatment, expensive cutting processes such as laser cutting or plasma cutting need not be utilized.

Heat treatment machine 44 generally has a roller drive 48 coupled to rollers 50. Rollers 50 provide a path down which beam stock 42 is guided through a heater such as an induction coil 52 and a quencher 54. A central controller 56 may be used to control the operation of the entire system or various portions thereof. Controller 56 may be coupled to roller drive 48, roller 50, induction coil 52 and quencher 54. Controller 56 may also be coupled to a display 58 for displaying information regarding processing, a keypad 60 which may be used to input information about processing into controller 56 and a sensor 62 which may be used to determine when the front edge of beam stock 42 enters the system. In its simplest form controller 56 may merely be a timer coupled to induction coil 52 to control the cycling of induction coil 52 between and on-state and an off-state to treat and not heat treat portions of beam stock 42. In more sophisticated embodiments requiring a greater level of automation and precision, controller 56 may be a microprocessor based system used to control the operation of the entire cutting machine 46.

Roller drive 48 controls the movement of beam stock 42 along a predetermined path defined by rollers 50. Although six rollers are illustrated in FIG. 8, a greater number of rollers are most likely to be required to hold and process beam stock 42. The number of rollers 50 may be also adjusted to compensate for the length of beam stock that is likely to be supplied into heat treatment machine 44. Roller drive 48 preferably controls the speed of beam stock 42 while portions of beam stock 42 are being heat treated. Rollers 50 may be positioned in a manner so that beam stock 42 is rotated about its longitudinal axis to ensure even heat treatment of beam stock 42. Roller drive 48 may provide feedback to controller as to the speed of beam stock 42 so that the operation of induction coil 52 may be precisely controlled in relation to the length of beam stock 42. In a simplified embodiment, rollers may simply be a constant drive system wherein a constant speed of beam stock is used. Beam stock 42 may for example be moving at 1 inch per second.

Induction coil 52 is preferably a conventionally known type induction coil. Induction coil 52 preferably is capable of raising the temperature of beam stock 42 in the range of 1500 to 1800 degrees F. while beam stock 42 is moving at a pre-determined rate. The induction coil 52 raises the temperature so that the steel reaches the austensite phase.

Quencher 54 provides a water spray 64 directed to beam stock 42 for rapidly cooling the heat treated beam stock. After quenching the steel reaches the martensitic phase. Quencher 54 need only be cycled on while heated beam stock 42 passes between it. Quenching may increase tensile strength by two to three times. For example, using an increase from about 80 KSI to about 234 KSI was observed after quenching using a steel conforming to the GM specification. A small amount of additives may be added to the water as is generally known in the art.

In a more sophisticated embodiment, the length of the particular beam stock may be programmed into controller 56 by keypad 60. Keypad 60 may be also used to program information such as the temperature that is desired to be reached by induction coil 52, the length at which beam stock 42 is cut into beam bodies 22 by cutting machine 46 to suit the particular vehicle application.

Sensor 42 may be a laser or other proximity sensor used to signal controller 56 that beam stock 42 has entered heat treatment machine 44. By knowing the position of the front edge of beam stock 42, induction coil 52 and quencher 54 may be cycled between the on-state and off-state at the appropriate times so that center portion 30 is heat treated and end portions 32 of each beam body 22 will be at the desired positions.

If cutting machine 46 is placed at the input of heat treatment machine 44 shorter beam bodies 22 will progress over rollers 50 and through induction coil 52. Rollers 50 may provide rotating movement to each beam body 22 as well as each beam body 22 contacting the adjacent beam body so that uniform heat treatment is provided to each beam body.

In operation, the entire operation may nearly be entirely automated. That is, depending on the processing rate for a roll forming machine and heat treatment machine 44, beam stock formed in roll forming machine 40 may be fed directly into heat treatment machine 44 through a conventional conveyor-type system. It is, however, envisioned that roll forming machine 40 may be capable of processing material faster than heat treatment machine 44. In such a situation one or multiples of roll forming machines 40 may be used to supply a multiple number of heat treatment machines 44 so that the processing rate of the roll forming machines together match the processing rate of the heat treatment machines.

While the best mode for carrying out the present invention has been described in detail, those familiar with the art to which this invention relates will recognize various alternative designs and embodiments for practicing the invention as defined by the following claims. For example, depending on the load characteristics various portions along the length of the beam body may be treated and non heat treated.

What is claimed is:

1. A side intrusion beam assembly comprising:
   a pair of end brackets; and
   a beam body coupled to said end brackets having a length having a center portion and end portions, said center portion being heat treated and said end portions being non heat treated.

2. A side intrusion beam as recited in claim 1, wherein said beam body has equal length end portions.

3. A side intrusion beam as recited in claim 1, wherein said beam body is tubular.

4. A side intrusion beam as recited in claim 3, wherein said beam body has a round cross section.

5. A side intrusion beam as recited in claim 3, wherein said beam body has a rectangular cross section.

6. A side intrusion beam as recited in claim 3, wherein said beam body has a triangular cross section.

7. A side intrusion beam as recited in claim 1, wherein said beam body has a hat-shaped cross section.

8. A side intrusion beam as recited in claim 1, wherein said beam body center portion has a non heat treated portion interspaced between heat treated portions.

9. A side intrusion beam assembly comprising:
   a pair of non heat treated end brackets; and
   a beam body coupled to said end brackets having a length having a center portion and end portions, said center portion being heat treated and said end portions being non heat treated.

10. A side intrusion beam as recited in claim 9, wherein said beam has a generally constant predetermined cross sectional configuration.

11. A side intrusion beam as recited in claim 10, wherein said beam body is tubular.

12. A side intrusion beam as recited in claim 11, wherein said beam body has a round cross section.

13. A side intrusion beam as recited in claim 11, wherein said beam body has a rectangular cross section.

14. A side intrusion beam as recited in claim 11, wherein said beam body has a triangular cross section.

15. A side intrusion beam as recited in claim 9, wherein said beam body has a hat-shaped cross-section.

16. A side intrusion beam as recited in claim 8, wherein said beam body center portion has a non heat treated portion interspaced between heat treated portions.

17. A side intrusion beam as recited in claim 16, wherein said beam has a generally constant predetermined cross sectional configuration.

18. A side intrusion beam comprising:
   a beam body having a length having a center portion and end portions, said center portion having two heat treated portions interspaced by a non heat treated portions and said beam body end portions being non heat treated.

* * * * *